(12) United States Patent
Burge

(10) Patent No.: US 11,306,642 B2
(45) Date of Patent: Apr. 19, 2022

(54) EXHAUST SENSOR BAFFLE

(71) Applicant: Faurecia Emissions Control Technologies, USA, LLC, Columbus, IN (US)

(72) Inventor: Neil Burge, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 241 days.

(21) Appl. No.: 16/454,600

(22) Filed: Jun. 27, 2019

(65) Prior Publication Data

US 2020/0408133 A1    Dec. 31, 2020

(51) Int. Cl.
| | |
|---|---|
| *F01N 11/00* | (2006.01) |
| *F01N 13/00* | (2010.01) |
| *F01N 13/08* | (2010.01) |
| *F01N 3/20* | (2006.01) |
| *B01D 53/94* | (2006.01) |

(52) U.S. Cl.
CPC .......... *F01N 11/007* (2013.01); *F01N 13/008* (2013.01); *F01N 13/08* (2013.01); *B01D 53/9418* (2013.01); *F01N 3/2066* (2013.01); *F01N 2550/02* (2013.01); *F01N 2560/026* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,534,213 A | * | 8/1985 | Mirikidani | .......... F02D 41/1439 |
| | | | | 73/114.71 |
| 5,955,682 A | * | 9/1999 | Faircloth | .............. G01N 1/2273 |
| | | | | 73/863.51 |
| 6,843,104 B2 | * | 1/2005 | Busch | .................. G01N 1/2252 |
| | | | | 73/23.31 |
| 8,756,913 B2 | | 6/2014 | Liu et al. | |

(Continued)

FOREIGN PATENT DOCUMENTS

| | | |
|---|---|---|
| DE | 102010043750 A1 | 5/2012 |
| DE | 102014217844 A1 | 3/2016 |

(Continued)

OTHER PUBLICATIONS

First Examination Report for Indian Patent Application No. 202014024515 dated Nov. 9, 2021.

(Continued)

*Primary Examiner* — Binh Q Tran
(74) *Attorney, Agent, or Firm* — Carlson, Gaskey & Olds, P.C.

(57) ABSTRACT

An exhaust system includes an exhaust duct that defines an exhaust gas passage extending along an axis and which has a cross-section extending across the axis. At least one sensor opening in the exhaust duct is configured to receive an exhaust gas sensor. A baffle is positioned within the exhaust gas passage and includes a plurality of guide channels with open cross-sections. Each guide channel extends from a first end facing an inner surface of the exhaust duct to a second end opposite the first end. The guide channels guide exhaust gas from different regions of the cross-section toward the at least one sensor opening.

24 Claims, 2 Drawing Sheets

(56) References Cited

U.S. PATENT DOCUMENTS

| | | | |
|---|---|---|---|
| 10,883,407 B1* | 1/2021 | Hornback | B01D 53/9431 |
| 10,907,520 B1* | 2/2021 | Ker | F01N 11/00 |
| 2007/0214862 A1 | 9/2007 | Kubinski et al. | |
| 2011/0179769 A1* | 7/2011 | Zhang | F01N 13/008 |
| | | | 60/273 |
| 2013/0213013 A1* | 8/2013 | Mitchell | F01N 3/2066 |
| | | | 60/276 |
| 2015/0160102 A1 | 6/2015 | Denis et al. | |
| 2016/0305297 A1* | 10/2016 | Wadke | G01N 33/004 |
| 2017/0226916 A1* | 8/2017 | Zhang | F01N 13/008 |
| 2018/0038817 A1* | 2/2018 | Uchiyama | G01N 15/0656 |
| 2018/0128146 A1 | 5/2018 | Ciaravino et al. | |
| 2018/0135496 A1 | 5/2018 | Yi et al. | |

FOREIGN PATENT DOCUMENTS

| | | | |
|---|---|---|---|
| EP | 3431731 A1 | 1/2019 | |
| JP | 2017089562 A | 5/2017 | |

OTHER PUBLICATIONS

Korean Official Action dated Nov. 3, 2021 for KR Application No. 10-2020-0070958.

* cited by examiner

EXHAUST SENSOR BAFFLE

TECHNICAL FIELD

This disclosure relates generally to a baffle to direct exhaust gas toward a sensor tip located within an exhaust duct.

BACKGROUND

Vehicles include exhaust systems that utilize catalysts to remove contaminants from engine exhaust gases. One example of such a catalyst is a Selective Catalytic Reduction (SCR) catalyst where nitrogen oxide (NOx) reduction reactions take place in an oxidizing atmosphere. Levels of NOx are reduced using ammonia as a reductant within a catalyst system. A reduction chemical reaction occurs when a reducing agent reacts with NOx to convert the pollutants into nitrogen, water, and small amounts of $CO_2$. A NOx sensor is used to measure residual NOx content of the exhaust gas exiting the SCR catalyst.

SUMMARY

An apparatus according to an exemplary aspect of the present disclosure includes, among other things, an exhaust duct that defines an exhaust gas passage extending along an axis and which has a cross-section extending across the axis. At least one sensor opening in the exhaust duct is configured to receive an exhaust gas sensor. A baffle is positioned within the exhaust gas passage and includes a plurality of guide channels with open cross-sections. Each guide channel extends from a first end facing an inner surface of the exhaust duct to a second end opposite the first end. The guide channels guide exhaust gas from different regions of the cross-section toward the at least one sensor opening.

In a further non-limiting embodiment of the foregoing apparatus, the open cross-sections have a U-shape or a C-shape.

In a further non-limiting embodiment of any of the foregoing apparatus, at least one of the guide channels includes a plurality of holes and/or perforations.

In a further non-limiting embodiment of any of the foregoing apparatus, the cross-section of the exhaust duct defines a plane that is perpendicular to the axis, and wherein one or more of the guide channels extend at an angle that is transverse to the plane.

In a further non-limiting embodiment of any of the foregoing apparatus, each guide channel has first and second edges extending from the first end to the second end, and wherein each guide channel is defined by a length extending from the first end to the second end and a width extending from the first edge to the second edge, and wherein the width of one or more of the guide channels narrows in a direction toward the second end.

In a further non-limiting embodiment of any of the foregoing apparatus, the baffle includes a body portion that is connected to the second ends of the guide channels, and wherein the body portion includes a curved outer edge that is configured to extend at least partially around a tip of the exhaust gas sensor.

In a further non-limiting embodiment of any of the foregoing apparatus, each guide channel is defined by a length extending from the first end to the second end, and wherein at least one of the guide channels has a shorter length than another of the guide channels.

In a further non-limiting embodiment of any of the foregoing apparatus, the plurality of guide channels comprises at least four guide channels and wherein two of the four guide channels have a first length and the other two of the four guide channels have a second length that is greater than the first length.

In a further non-limiting embodiment of any of the foregoing apparatus, at least one SCR catalyst is upstream of the sensor opening, and wherein the at least one sensor comprises a NOx sensor.

An apparatus, according to yet another exemplary aspect of the present disclosure includes, among other things, an exhaust duct that defines an exhaust gas passage extending along an axis and which has a cross-section extending across the axis. The exhaust duct includes at least one sensor opening. At least one SCR catalyst is upstream of the sensor opening and a NOx sensor is mounted within the sensor opening and extends to a sensor tip that is within the exhaust gas passage. A baffle is positioned within the exhaust gas passage and includes a plurality of guide channels with open cross-sections. Each guide channel extends from a first end facing an inner surface of the exhaust duct to a second end opposite the first end. The guide channels guide exhaust gas from different regions of the cross-section toward the sensor tip.

In a further non-limiting embodiment of any of the foregoing apparatus, the open cross-sections have a U-shape or a C-shape.

In a further non-limiting embodiment of any of the foregoing apparatus, at least one of the guide channels includes a plurality of holes and/or perforations.

In a further non-limiting embodiment of any of the foregoing apparatus, the cross-section of the exhaust duct defines a plane that is perpendicular to the axis, and wherein one or more of the guide channels extend at an angle that is transverse to the plane.

In a further non-limiting embodiment of any of the foregoing apparatus, each guide channel has first and second edges extending from the first end to the second end, and wherein each guide channel is defined by a length extending from the first end to the second end and a width extending from the first edge to the second edge, and wherein the width of one or more of the guide channels narrows in a direction toward the second end.

In a further non-limiting embodiment of any of the foregoing apparatus, the baffle includes a body portion that is connected to the second ends of the guide channels, and wherein the body portion includes a curved outer edge that extends at least partially around the sensor tip.

In a further non-limiting embodiment of any of the foregoing apparatus, a first guide channel of the plurality of guide channels is positioned adjacent one end of the curved outer edge and a second guide channel of the plurality of guide channels is positioned adjacent an opposite end of the curved outer edge, and wherein the body portion includes a notch at each of the second ends of the first and second guide channels.

In a further non-limiting embodiment of any of the foregoing apparatus, a center of the body portion is offset from the axis.

In a further non-limiting embodiment of any of the foregoing apparatus, each guide channel is defined by a length extending from the first end to the second end, and wherein at least one of the guide channels has a shorter length than another of the guide channels.

In a further non-limiting embodiment of any of the foregoing apparatus, the plurality of guide channels comprises at least four guide channels and wherein first and second guide channels of the four guide channels have a first length, and third and fourth guide channels of the four guide channels have a second length that is greater than the first length.

In a further non-limiting embodiment of any of the foregoing apparatus, the third and fourth guide channels are positioned circumferentially between the first and second guide channels.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
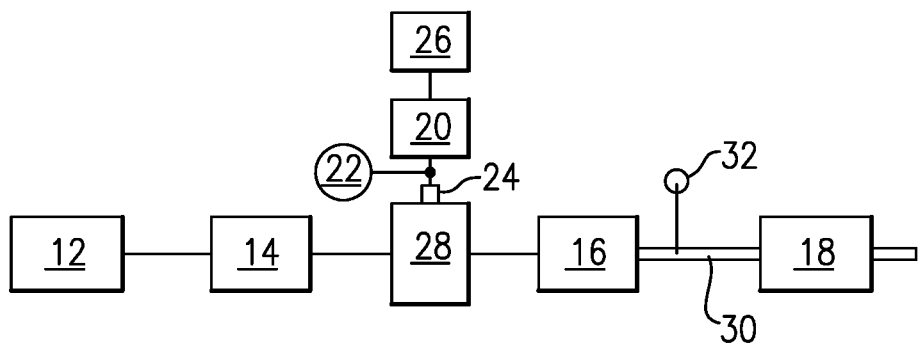
FIG. 1 illustrates a schematic view of a vehicle exhaust system.

This disclosure details an exemplary baffle that directs exhaust gas toward a sensor tip located within an exhaust duct. FIG. 1 shows a vehicle exhaust system 10 that conducts hot exhaust gases generated by an engine 12 through various upstream exhaust components 14 to reduce emission and control noise as known. In one example configuration, the upstream exhaust component 14 can comprise a diesel oxidation catalyst (DOC) and/or a diesel particulate filter (DPF) that is used to remove contaminants from the exhaust gas as known. Downstream of these upstream exhaust components 14 is one or more additional exhaust gas aftertreatment components 16 that also remove contaminants from the exhaust gas as known. Exhaust gases exiting the exhaust gas aftertreatment components 16 are conducted to downstream exhaust components 18 such as resonators, mufflers, etc., and eventually exit to atmosphere. These upstream 14 and downstream 18 components can be mounted in various different configurations and combinations dependent upon vehicle application and available packaging space.

In one example configuration, an injection system 20 is used to inject a reducing agent, such as a solution of urea and water for example, into the exhaust gas stream upstream from the exhaust gas aftertreatment components 16. The injection system 20 includes a fluid supply 22, a doser/injector 24, and a controller 26 that controls injection of the urea as known. An optional mixer 28 can also be positioned upstream of the exhaust gas aftertreatment components 16 such that the mixer 28 can mix the injected reducing agent and exhaust gas thoroughly together prior to entering the exhaust gas aftertreatment components 16.

In one example configuration, the exhaust gas aftertreatment component 16 comprises at least one Selective Catalytic Reduction (SCR) catalyst where the reducing agent reacts with NOx to convert the pollutants into nitrogen, water, and small amounts of CO2. Exhaust gas exiting the SCR catalyst enters an exhaust pipe or duct 30 and an exhaust gas sensor 32, e.g. a NOx sensor, is used to measure residual NOx content of the exhaust gas exiting the SCR catalyst. The structure and operation of the NOx sensor 32 is known, and any type of NOx sensor can be used to measure the residual NOx content of the exhaust gas.

Figure 2A:
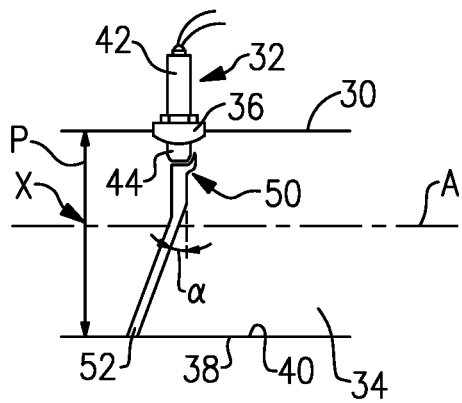
FIG. 2A is a schematic side view of an exhaust gas sensor and baffle within an exhaust duct as utilized in the vehicle exhaust system of FIG. 1.

As shown in FIG. 2A, the exhaust duct 30 defines an exhaust gas passage 34 extending along an axis A and has a cross-section X extending across the axis A. At least one sensor opening 36 is formed in the exhaust duct 30. The sensor opening 36 extends through a wall thickness of the duct 30 from an external surface 38 to an internal surface 40. The sensor opening 36 receives a body 42 of the exhaust gas sensor 32 which extends to a sensor tip 44 that protrudes into the exhaust gas passage 34.

A baffle 50 is positioned within the exhaust gas passage 34 and includes a plurality of guide channels 52 with open cross-sections configured to guide exhaust gas from different regions of the cross-section X toward the sensor tip 44 and/or sensor opening 36. Each guide channel 52 extends from a first end 54 facing the internal surface 40 of the exhaust duct 30 to second end 56 opposite the first end 54. Exhaust gas from different regions of the cross-section X are directed by the guide channels 52 to the sensor tip 44.

Figure 2B:
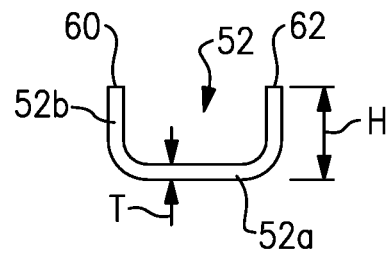
FIG. 2B is a schematic section view of a guide channel from the baffle of FIG. 2A.

The guide channels 52 have open cross-sections such that the channels 52 are not completely enclosed on all sides. At least one area of the guide channels 52 is open directly to the exhaust gas passage 34. As shown in FIG. 2B, in one example, the open cross-sections have a U-shape or a C-shape. Thus, the guide channels 52 have a base portion 52a that is generally flat, or which can have a slight curvature, and a pair of opposing guide walls 52b. One guide wall 52b extends away from each end of the base portion 52a to form the C or U shape. The guide channels 52 have a thickness T that is relatively uniform throughout the section as shown in FIG. 2B. The guide walls 52b have a height H that is greater than the thickness T. In one example, the H is at least two times greater than the thickness T.

Figure 2C:
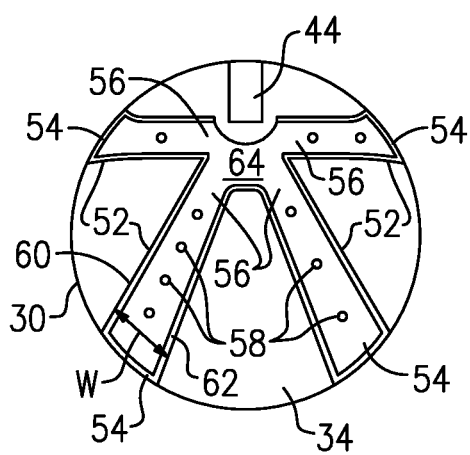
FIG. 2C is a schematic front view of the baffle of FIG. 2A.
Figure 3:
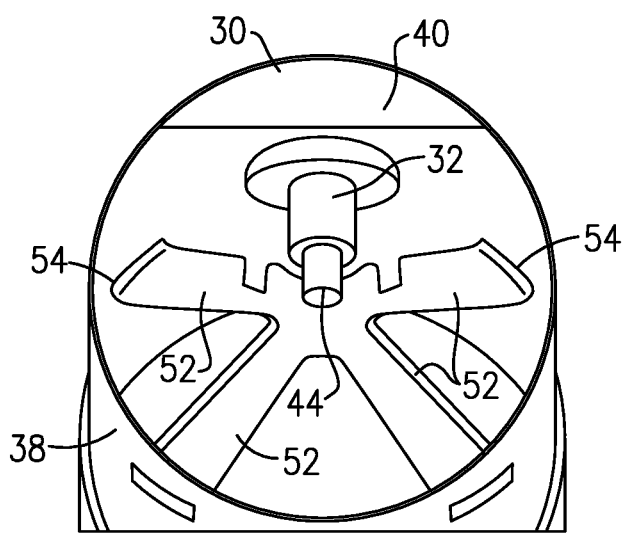
FIG. 3 is a perspective view of the exhaust gas sensor and baffle within the exhaust duct of FIG. 2A.
Figure 4:
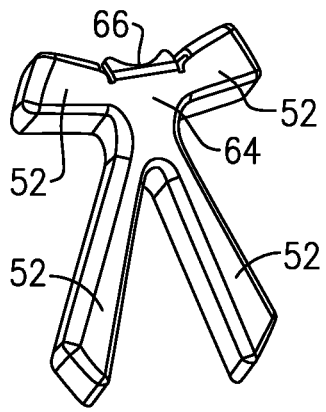
FIG. 4 is a perspective view of the baffle of FIG. 3.

In one example, the guide channels 52 can include perforations and/or holes 58 (FIG. 2C). The holes 58 can be added to reduce back pressure in the exhaust duct 30 or to reduce influence of the specific guide channel 52.

As shown in FIG. 2A, the cross-section X of the exhaust duct 30 defines a plane P that is perpendicular to the axis A. One or more of the guide channels 52 extend at an angle α that is transverse to the plane P. In one example, the angle α is approximately 35 degrees; however, other angles could also be used depending upon the specific channel and duct configuration.

Each guide channel 52 has first 60 and second 62 edges (FIG. 2B) extending from the first end 54 to the second end 56. Each guide channel 52 is defined by a length L (FIG. 5) extending from the first end 54 to the second end 56 and a width W (FIGS. 2C and 5) extending from the first edge 60 to the second edge 62. In one example, the width W of one or more of the guide channels 52 narrows in a direction toward the second end 56 such that the exhaust gas is directed more precisely toward the sensor tip 44.

In one example, at least one of the guide channels 52 has a shorter length L than another of the guide channels 52.

In one example, one or more of the guide channels 52 are fixed to the internal surface 40 of the exhaust duct 30 to hold the baffle 50 in place. In one example, the first ends 54 of the guide channels 52 are fixed to the exhaust duct 30.

Figure 5:
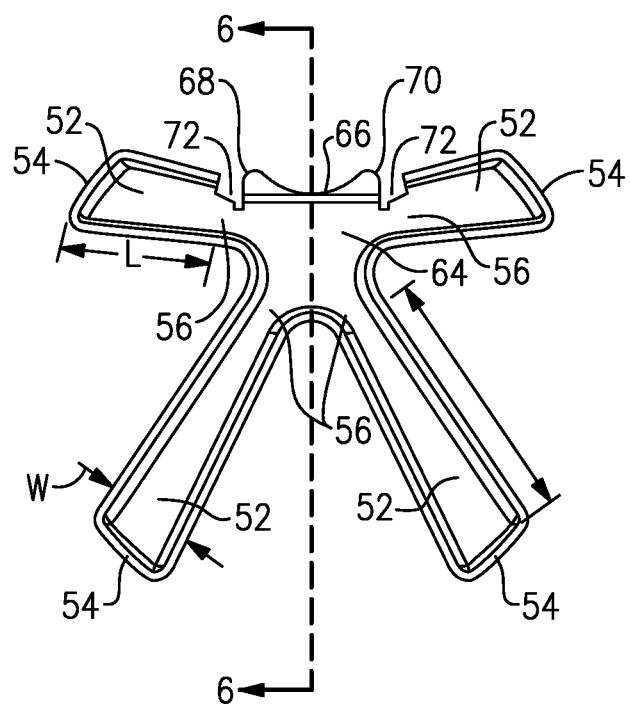
FIG. 5 is a front view of the baffle of FIG. 4.
Figure 6:
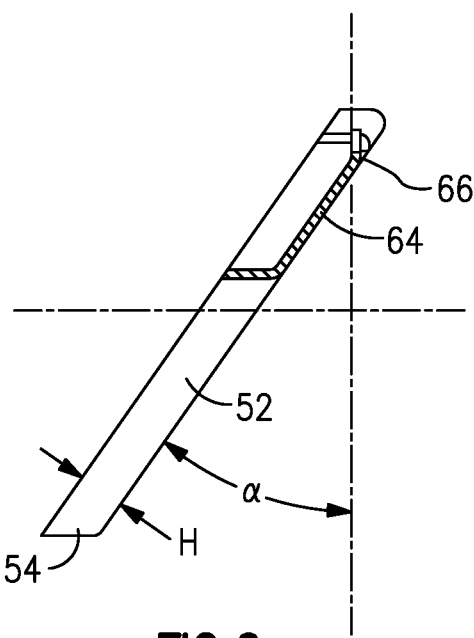
FIG. 6 is a section view taken along lines 6-6 of FIG. 5.

In one example, the plurality of guide channels 52 comprises at least four guide channels 52 as shown in FIG. 5. In this example, two of the four guide channels 52 have a first length and the other two of the four guide channels 52 have a second length that is greater than the first length. In one example configuration, the guide channels 52 with the longer length are positioned circumferentially between the guide channels 52 with the shorter length. While four guide channels are shown, fewer or additional guide channels could be utilized dependent upon the application and desired configuration.

As shown in FIGS. 3-6, the baffle 50 includes a body portion 64 that is connected to the second ends 56 of the guide channels 52. A center of the body portion 64 is offset from the axis A. The body portion 64 includes a curved outer edge 66 that is configured to extend at least partially around the sensor tip 44 of the exhaust gas sensor 32. The curved outer edge 66 comprises a concave surface that faces the sensor tip 44. In one example, one guide channel 52 is positioned adjacent one end 68 of the curved outer edge 66 and a second guide channel 52 is positioned adjacent an opposite end 70 of the curved outer edge 66 as best shown in FIG. 5. The body portion 64 includes a notch 72 at each of the second ends 56 of the guide channels 52 that are on either side of the curved outer edge 66.

As discussed above, the exhaust gas sensor 32 is positioned downstream of an SCR catalyst and is used to measure residual NOx content of the exhaust gas exiting the SCR catalyst. The baffle 50 improves the sampling accuracy of the sensor 32. The guide channels 52 of the baffle 50 extend the effective sampling area of the sensor 32 by guiding exhaust gas that is representative of all the exhaust gas in the system and not just the gas closest to the sensor tip 44.

In one example, the baffle 50 is a single-piece stamped component. The baffle 50 includes the angled guide channels 52 with open cross-sections that direct exhaust gas from different regions of the duct cross-section X towards the sensor tip 44. The curved shaping of the stamping at the sensor tip 44 guides exhaust gas flow past the tip 44 and the channels 52 narrow as they get closer to the tip 44 to more precisely guide the exhaust gas to the tip 44. This stamped configuration is inexpensive to manufacture and is simple to install. Further, the baffle 50 can be fitted into existing designs with only minimal changes.

While the baffle is shown as being used with a NOx sensor, it should be understood that the baffle 50 could be used with other types of exhaust gas sensors.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An exhaust system comprising:
an exhaust duct defining an exhaust gas passage extending along an axis and having a cross-section extending across the axis;
at least one sensor opening in the exhaust duct that is configured to receive an exhaust gas sensor; and
a baffle positioned within the exhaust gas passage, the baffle including a plurality of guide channels with open cross-sections, each guide channel extending from a first end facing an inner surface of the exhaust duct to a second end opposite the first end, and wherein the guide channels guide exhaust gas from different regions of the cross-section toward the at least one sensor opening.

2. The exhaust system according to claim 1 wherein the open cross-sections have a U-shape or a C-shape.

3. The exhaust system according to claim 1 wherein at least one of the guide channels includes a plurality of holes and/or perforations.

4. The exhaust system according to claim 1 wherein the cross-section of the exhaust duct defines a plane that is perpendicular to the axis, and wherein one or more of the guide channels extend at an angle that is transverse to the plane.

5. The exhaust system according to claim 1 wherein each guide channel has first and second edges extending from the first end to the second end, and wherein each guide channel is defined by a length extending from the first end to the second end and a width extending from the first edge to the second edge, and wherein the width of one or more of the guide channels narrows in a direction toward the second end.

6. The exhaust system according to claim 1 wherein the baffle includes a body portion that is connected to the second ends of the guide channels, and wherein the body portion includes a curved outer edge that is configured to extend at least partially around a tip of the exhaust gas sensor.

7. The exhaust system according to claim 1 wherein each guide channel is defined by a length extending from the first end to the second end, and wherein at least one of the guide channels has a shorter length than another of the guide channels.

8. The exhaust system according to claim 7 wherein the plurality of guide channels comprises at least four guide channels and wherein two of the four guide channels have a first length and the other two of the four guide channels have a second length that is greater than the first length.

9. The exhaust system according to claim 1 including at least one SCR catalyst upstream of the sensor opening, and wherein the at least one sensor comprises a NOx sensor.

10. An exhaust system comprising:
an exhaust duct defining an exhaust gas passage extending along an axis and having a cross-section extending across the axis, and wherein the exhaust duct includes at least one sensor opening;
at least one SCR catalyst upstream of the sensor opening;
a NOx sensor mounted within the sensor opening and extending to a sensor tip that is within the exhaust gas passage; and
a baffle positioned within the exhaust gas passage, the baffle including a plurality of guide channels with open cross-sections, each guide channel extending from a first end facing an inner surface of the exhaust duct to a second end opposite the first end, and wherein the guide channels guide exhaust gas from different regions of the cross-section toward the sensor tip.

11. The exhaust system according to claim 10 wherein the open cross-sections have a U-shape or a C-shape.

12. The exhaust system according to claim 10 wherein at least one of the guide channels includes a plurality of holes and/or perforations.

13. The exhaust system according to claim 10 wherein the cross-section of the exhaust duct defines a plane that is perpendicular to the axis, and wherein one or more of the guide channels extend at an angle that is transverse to the plane.

14. The exhaust system according to claim 10 wherein each guide channel has first and second edges extending from the first end to the second end, and wherein each guide channel is defined by a length extending from the first end to the second end and a width extending from the first edge to the second edge, and wherein the width of one or more of the guide channels narrows in a direction toward the second end.

15. The exhaust system according to claim 10 wherein the baffle includes a body portion that is connected to the second ends of the guide channels, and wherein the body portion includes a curved outer edge that extends at least partially around the sensor tip.

16. The exhaust system according to claim 15 wherein a first guide channel of the plurality of guide channels is positioned adjacent one end of the curved outer edge and a second guide channel of the plurality of guide channels is positioned adjacent an opposite end of the curved outer edge, and wherein the body portion includes a notch at each of the second ends of the first and second guide channels.

17. The exhaust system according to claim 15 wherein a center of the body portion is offset from the axis.

18. The exhaust system according to claim 10 wherein each guide channel is defined by a length extending from the first end to the second end, and wherein at least one of the guide channels has a shorter length than another of the guide channels.

19. The exhaust system according to claim 18 wherein the plurality of guide channels comprises at least four guide channels and wherein first and second guide channels of the four guide channels have a first length, and third and fourth guide channels of the four guide channels have a second length that is greater than the first length.

20. The exhaust system according to claim 19 wherein the third and fourth guide channels are positioned circumferentially between the first and second guide channels.

21. The exhaust system according to claim 10 wherein each guide channel is defined by a length extending from the first end to the second end, and wherein the open cross-section of each guide channel extends from the first end to the second end such that each guide channel is open to the exhaust gas passage along the length.

22. The exhaust system according to claim 10 wherein each guide channel has a base portion and a pair of opposing guide walls extending to distal edges that are spaced apart from each other by an open gap that extends along a length of each guide channel from the first end to the second end.

23. The exhaust system according to claim 1 wherein each guide channel is defined by a length extending from the first end to the second end, and wherein the open cross-section of each guide channel extends from the first end to the second end such that each guide channel is open to the exhaust gas passage along the length.

24. The exhaust system according to claim 1 wherein each guide channel has a base portion and a pair of opposing guide walls extending to distal edges that are spaced apart from each other by an open gap that extends along a length of each guide channel from the first end to the second end.

* * * * *